United States Patent
Tamisier et al.

(10) Patent No.: US 6,927,550 B2
(45) Date of Patent: Aug. 9, 2005

(54) DEVICE AND METHOD USED TO AUTOMATICALLY COMPENSATE FOR SYNCHRONOUS DISTURBANCE

(75) Inventors: Vincent Tamisier, Vernon (FR); François Carrere, Beauchamp (FR); Stéphane Font, Alfortville (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 61 days.

(21) Appl. No.: 10/488,847

(22) PCT Filed: Sep. 5, 2002

(86) PCT No.: PCT/FR02/03015
§ 371 (c)(1),
(2), (4) Date: Aug. 17, 2004

(87) PCT Pub. No.: WO03/021123
PCT Pub. Date: Mar. 13, 2003

(65) Prior Publication Data
US 2004/0257023 A1 Dec. 23, 2004

(30) Foreign Application Priority Data
Sep. 6, 2001 (FR) .......................................... 01 11562

(51) Int. Cl.⁷ .............................. G05B 1/06; G05B 11/01
(52) U.S. Cl. ........................ 318/611; 318/609; 318/610; 318/623; 318/629; 310/90.5; 342/401; 73/660
(58) Field of Search ........................ 318/110–128, 609, 318/610, 611, 623, 629–632; 310/90.5; 342/401; 73/660

(56) References Cited

U.S. PATENT DOCUMENTS

| | | | |
|---|---|---|---|
| 4,121,143 A | | 10/1978 | Habermann et al. |
| 4,128,795 A | * | 12/1978 | Habermann et al. ........ 318/618 |
| 4,626,754 A | * | 12/1986 | Habermann et al. ........ 318/460 |
| 4,697,128 A | * | 9/1987 | Matsushita et al. ......... 318/607 |
| 4,839,550 A | | 6/1989 | Mizuno et al. |
| 4,912,387 A | | 3/1990 | Moulds, III |
| 5,313,399 A | * | 5/1994 | Beale .......................... 701/124 |
| 5,400,256 A | | 3/1995 | Beale et al. |
| 5,936,370 A | * | 8/1999 | Fukao et al. ................. 318/652 |
| 6,145,381 A | * | 11/2000 | Mathisen et al. ............. 73/660 |
| 6,590,358 B1 | * | 7/2003 | Tsutsui ........................ 318/560 |
| 6,614,396 B2 | * | 9/2003 | Pina et al. ................... 342/401 |
| 6,806,606 B2 | * | 10/2004 | Ohtachi et al. ............. 310/90.5 |

FOREIGN PATENT DOCUMENTS

| | | |
|---|---|---|
| DE | 31 20 691 A | 12/1982 |
| DE | 42 27 014 A | 2/1994 |
| FR | 2 094 326 | 2/1972 |
| FR | 2 149 644 | 3/1973 |
| FR | 2 336 602 | 7/1977 |

* cited by examiner

Primary Examiner—Paul Ip
(74) Attorney, Agent, or Firm—Weingarten, Schurgin, Gagnebin & Lebovici LLP

(57) ABSTRACT

To eliminate unwanted vibrations caused by synchronous disturbances, such as synchronous disturbances caused by an imbalance, for example, the invention proposes a compensation device for closed loop compensation of a synchronous disturbance in a rotating machine comprising a rotor (64) magnetically suspended by at least one radial magnetic bearing (63) comprising electromagnets (631, 632) driven by amplifiers (61, 62), a radial detector device (633, 634) for sensing the axial position of the rotor, and a closed loop servocontrol circuit connected to said detector device and to said electromagnets and comprising a control circuit (5) for controlling the energization of the electromagnets that supplies a control signal (u) to said amplifiers in response to signals supplied by the detector device to maintain the rotor in a predetermined axial position. The compensation device comprises means (100; 200; 300) for generating a signal for compensating the synchronous disturbance. Said means are inserted into the servocontrol circuit ahead of the energization control circuit (5) to minimize variation of the control signal in relation to the disturbances.

27 Claims, 7 Drawing Sheets

DEVICE AND METHOD USED TO AUTOMATICALLY COMPENSATE FOR SYNCHRONOUS DISTURBANCE

This application is a 371 national phase filing of PCT/FR02/03015 filed Sep. 5, 2002, and claims priority to a French application No. 01/11562 filed Sep. 6, 2001.

FIELD OF THE INVENTION

The present invention relates to a device and a method for active compensation of fundamental frequency, harmonic, and subharmonic components of a disturbance of the rotation speed of a magnetically suspended rotor in a rotating machine. The invention relates more particularly to compensating fundamental, harmonic, or subharmonic disturbances whose frequencies correspond to a frequency of mechanical resonance of the system.

PRIOR ART

Rotating machine systems equipped with active magnetic bearings primarily comprise a rotary shaft or rotor, electromagnets disposed around the rotor to form a stator portion of the machine, sensors for sensing the radial position of the rotor, and control electronics that seek to maintain the rotor in a set point position. Systems of the above kind are described in French Patents FR 2 094 326 and FR 2 149 644 in particular.

Those systems are subject to harmonic disturbance of the rotation frequency (fundamental frequency $f_0$, higher harmonics $kf_0$ or lower harmonics $$\frac{1}{k}f_0,$$

where k is a positive integer), which can result from incorrect centering of the sensors, harmonic external forces created by the mode of use (the number of tool teeth in machining applications, driving a compressor wheel, etc.), position sensing errors during fabrication of the rotor, imbalance or non-linearities of servocontrol systems (threshold or saturation).

Of the various sources of harmonic disturbances in such rotating machine systems, imbalance constitutes an insurmountable problem. As shown in FIG. 10, which is a view in section of a rotor 20 magnetically suspended in a magnetic bearing 10 formed of a stator member equipped with electromagnets and position sensors, the imbalance reflects a lack of equilibrium of the rotor caused by the fact that its axis of inertia G is not on its geometrical rotation axis O. In operation, the imbalance generates vibrations of the geometric axis O of the rotor about the geometric center S of the bearing, which is determined by the sensors and represents the rotation axis imposed by the bearing. The offset between the axis of inertia G of the rotor and the rotation axis S imposed by the bearing results from imperfect balancing of the rotor, and eliminating the imbalance entails making the axis of inertia G of the rotor coincide with the rotation axis S of the bearing.

To avoid the effects of the imbalance, the axis of inertia is modified in the mechanical domain by removing mass from the rotor or by adding mass to the rotor with a particular phase relative to a system of axes that are fixed with respect to the rotor; the imbalance is the mass that has to be compensated to move the axis of inertia to the rotation axis. With an active magnetic bearing, the position of the rotation axis can be modified directly. However, as the rotation speed rises, the amplitude of the position error signal measured by the sensors passes through a maximum which is referred to as a resonance if the rotation frequency is equal to the natural frequency of the bearing, which is related to the switching frequency of the servocontrol system, which is generally a low frequency, i.e. below 200 hertz (Hz). There is therefore a critical rotation speed, otherwise known as a rigid mode. The amplitude of the control signal of the bearing amplifiers passes through a maximum on crossing a critical speed. The reaction of the looped system to this disturbance takes the form of synchronous vibrations.

There are many reasons for seeking to counter the effect of the imbalance on the looped system:
eliminating synchronous vibrations throughout the period in which the speed is rising to minimize vibration in the user process,
reducing the cost of mechanical balancing of the rotor,
avoiding excessive power consumption by the electromagnets and/or saturation of the amplifiers on crossing a critical speed, and thus economizing on the power electronics, and
optimizing the power to compensate disturbances other than synchronous disturbances for machines whose rotation speed is close to the critical speed of the bearing, for example in steel machining applications where all of the available power is required for the cutting force rather than for countering synchronous disturbances such as imbalance.

These objectives are not mutually incompatible and may be attempted simultaneously.

To overcome the effect on amplifier control and rotor position of a disturbance such as an imbalance, it is necessary to improve the balancing of the rotor or to increase the power of the electronics, i.e. to increase the manufacturing cost of the system, or to employ an active compensation device to minimize the cost of balancing and optimize the power required.

At present methods for eliminating synchronous vibrations such as those caused by an imbalance are of three types: closed loop compensation, "feedforward" open loop compensation, and convergent adaptive compensation with freezing of the result, otherwise known as "pseudo-feedforward" compensation.

A closed loop method of compensating synchronous disturbances is described in French Patent FR 2 336 602 and in U.S. Pat. No. 4,121,143. It counteracts the effect of the imbalance, for example, but only above the critical speeds. That method and the associated device can be used only if the rotation speed is at least 20% higher than the critical speed. That method of eliminating vibrations caused by imbalance can make the looped system unstable when the rotation speed is below this threshold. The required objectives as specified in standards such as the American Petroleum Institute (API) standard and the objectives in terms of minimizing power cannot be achieved with the above method. Another closed loop compensation method is described in U.S. Pat. No. 4,912,387, but relates only to improving synchronous compensation by canceling harmonics (noise cancellation). The problem of passing through critical speeds is not touched on.

Feedforward open loop compensation methods are based on a learning process that stores the displacement of certain points on the rotor at different speeds. A table of values known as an influence matrix is then produced and can be used afterwards to eliminate the effect of the imbalance over the whole of the range of operation. However, the matrix is representative of the state of the rotor at a given time and does not take account of any drift in the parameters. Moreover, that kind of learning process cannot be considered for each machine in the context of mass production, especially as it requires control electronics that are sufficiently powerful to cross the critical speeds at least once without saturating, in order to create the matrix.

Finally, adaptive convergent (pseudo-feedforward) compensation methods estimate from a measured position signal a compensation signal to be added to a control signal using a gradient algorithm, i.e. a convergent algorithm. One example of a method of this kind is described in U.S. Pat. No. 5,400,256. However, that document gives no indication as to the rate of convergence or the range of validity of compensation as a function of the rotor speed. In any looped system there are stability problems on passing through critical modes. Moreover, that type of method has the major drawback of being unable to track changes in the synchronous disturbance that it estimates from the time at which the algorithm has converged (the algorithm converges on a fixed rotation speed). Furthermore, that type of method does not guarantee convergence without oscillation in the absence of complete modeling. Also, it is difficult to apply that kind of method to machines featuring high acceleration.

Finally, there are prior art documents, such as German Patent Applications DE 42 27 014 and DE 31 20 691 and U.S. Pat. No. 4,839,550, that describe servocontrol of the position of a rotor supported by magnetic bearings, but none of these documents refer to the instability problems that may be encountered on crossing critical speeds.

To summarize, the prior art methods of compensating synchronous disturbances are not entirely satisfactory and have the drawback either of being unable to cover the whole of the range of speeds of the machine or of being unable to track changes to or drift in the synchronous disturbance.

OBJECT AND BRIEF DESCRIPTION OF THE INVENTION

The present invention aims to remedy the abovementioned drawbacks and to provide a compensation device which, for machines featuring low or high acceleration, eliminates vibrations caused by synchronous disturbances on crossing critical speeds, starting from a low rotation speed, and with no prior learning process.

The above objects are achieved by a compensation device for closed loop compensation of a synchronous disturbance in a rotating machine comprising a rotor magnetically suspended by at least one radial magnetic bearing comprising electromagnets driven by amplifiers, a radial detector device for sensing the axial position of the rotor, and a closed loop servocontrol circuit connected to said detector device and to said electromagnets and comprising a control circuit for controlling the energization of the electromagnets that supplies a control signal to the amplifiers in response to signals supplied by the detector device, to maintain the rotor in a predetermined axial position, which compensation device is characterized in that it comprises means for generating a signal for compensating the synchronous disturbance, said means being inserted into the servocontrol circuit ahead of the energization control circuit to minimize variation of the control signal in relation to the disturbance, and in that the compensation signal generator means comprise applicator means for applying at least one correction angle to assure the stability of the closed loop, the angle being determined as a function of the phase variation of the disturbance observed over a particular range of rotation speeds.

Thus the invention proposes a device for effecting closed loop active compensation before and while crossing critical speeds in rigid mode, without initialization or prior learning, the device also guaranteeing minimum power consumption for control purposes and preserving the stability of the system on crossing a critical speed.

More particularly, the compensation signal generator means comprise extractor means for extracting at least one frequency component of the disturbance signal in the servocontrol circuit, low-frequency filter means for filtering and transforming said extracted component, and modulator means for modulating the transformed component.

According to an aspect of the invention, the extractor means comprise a circuit for separating at least one subharmonic, fundamental frequency or harmonic component of the rotation speed of the machine by demodulation, a least squares method or Kalman filtering.

According to a feature of the invention, the means for transforming the extracted component comprise a rotation matrix for applying the correction angle.

According to another feature of the invention, the means for transforming the extracted component comprise means for applying a corresponding phase shift to the correction angle, which means may be included in the extractor means or in the modulator means.

According to a particular aspect of the invention, the synchronous disturbance is a disturbance caused by an imbalance in the rotor.

According to another aspect of the invention, the compensation device may be activated from a rotating machine rotation frequency of 30 Hz in the case of a turbomolecular pump or 100 Hz in the case of an air compressor.

The present invention also provides a method of closed loop compensation of a synchronous disturbance in a rotating machine comprising a rotor magnetically suspended by at least one radial magnetic bearing comprising electromagnets driven by amplifiers, a radial detector device for sensing the axial position of the rotor, and a closed loop servocontrol circuit connected to the detector device and to the electromagnets and comprising a control circuit for controlling the energization of the electromagnets that supplies a control signal to said amplifiers in response to signals supplied by the detector device, to maintain the rotor in a predetermined axial position, which method is characterized in that it comprises a step of generating a compensation signal for compensating the synchronous disturbance comprising the application of at least one correction angle to assure the stability of the closed loop, the correction angle being determined as a function of the phase variation of the disturbance observed over a particular range of rotation speeds, and a step of injecting the compensation signal into the servocontrol circuit ahead of the energization control circuit to minimize the variation of the control signal in relation to the disturbance.

To be more specific, the step of generating the compensation signal includes a step of extracting at least one frequency component from the disturbing signal in the servocontrol circuit, a step of low-frequency filtering of the extracted component, a step of transforming the extracted component, and a step of modulating the transformed component.

According to an aspect of the invention, the extraction step comprises the separation of at least one subharmonic, fundamental frequency or harmonic component of the rotation speed of the machine by demodulation, a least squares method or Kalman filtering.

According to a feature of the invention, the step of transforming the extracted component includes the application of a rotation to the component to apply the correction angle.

According to another feature of the invention, the step of transforming the extracted component includes the application of an angular phase shift corresponding to the correction angle.

The angular phase shift may be applied during the extraction step or during the modulation step.

According to a particular aspect of the invention, the synchronous disturbance is a disturbance caused by an imbalance in the rotor.

According to another aspect of the invention, the method is activated from a rotating machine rotation frequency of 30 Hz in the case of a turbomolecular pump or 100 Hz in the case of an air compressor.

BRIEF DESCRIPTION OF THE DRAWINGS

Other features and advantages of the invention emerge from the following description of particular embodiments of the invention provided by way of non-limiting example, which description is given with reference to the accompanying drawings, in which.

DETAILED DESCRIPTION OF EMBODIMENTS OF THE INVENTION

The present invention is described in relation to its primary application, namely the elimination of vibrations caused by imbalance. However, in the light of the following description, the person skilled in the art will be able without difficulty to apply the invention to any other synchronous or harmonic disturbance of rotation frequency encountered in a rotating machine equipped with magnetic bearings controlled by regulation loops. The expressions "synchronous disturbance" and "harmonic disturbance" refer to any disturbing signal whose frequency is a multiple of the rotation frequency of the machine, i.e. a signal that corresponds to the fundamental frequency $f_0$, to a higher harmonic $kf_0$ or to a lower harmonic $$\frac{1}{k}f_0,$$

where k is a positive integer.

Figure 1:
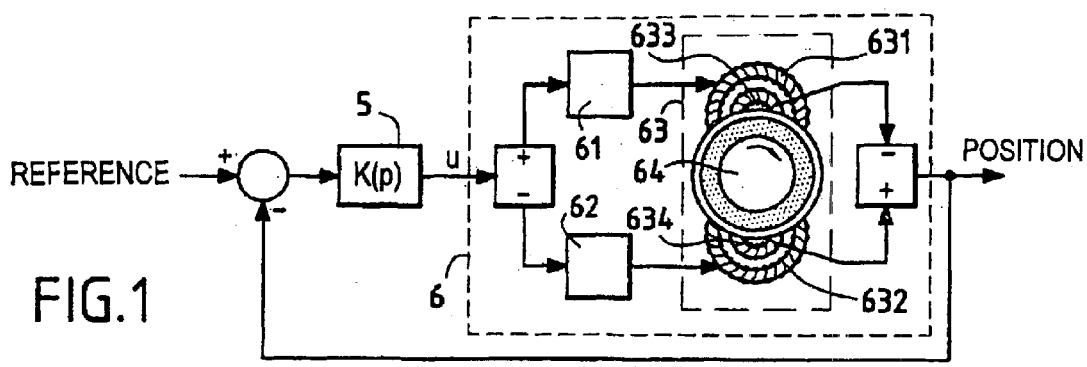
FIG. 1 is a simplified diagram of a regulation loop employing the principle of servocontrol of magnetic bearings.

To explain the invention, it is first necessary to explain the effect of the imbalance on the looped system. FIG. 1 depicts a simplified model of a closed servocontrol loop (regulation loop) controlling the position of a rotor 64 magnetically suspended by a bearing 63. The loop primarily comprises a corrector 5 adapted to send a reference signal and a control signal u that is a function of the measured position of the rotor. The control signal u is sent to the control system 6 of the bearings which, in response to the signal u, drives current amplifiers 61, 62 that supply the necessary energy to the windings 631, 632 of the bearing 63 to correct the position of the rotor. The system 6 also includes radial sensors 633, 634 which measure the axial position of the rotor in the plane of the bearing. The system 6 therefore outputs a position signal that is used in the loop, as shown in FIG. 1. This type of closed loop servocontrol and its use in a rotating machine equipped with active magnetic bearings are described in French Patents FR 2 094 326 and FR 2 149 644 and in U.S. Pat. No. 3,787,100.

Figure 10:
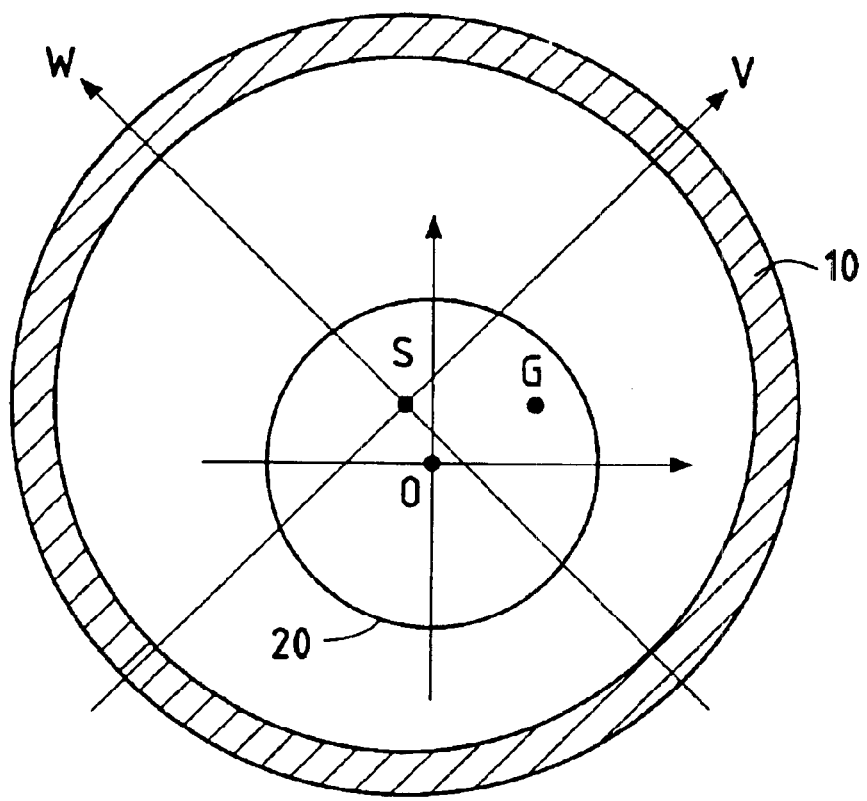
FIG. 10 is a diagrammatic view in section of a rotor in a magnetic bearing.

The return force generated by the bearings is applied to the inertia axis of the rotor and is a function of the distance between the geometrical axis of the rotor and the geometrical axis of the bearing (i.e. the distance OS in FIG. 10). The return force exerted on the rotor by the bearing induces an equal and opposite reaction force of the rotor on the bearing and thus on the whole of the frame of the machine. This reaction force accounts for the vibration phenomenon. In order for the invention to eliminate vibration, it is necessary to minimize variations of the return forces and therefore variations of the control signal.

Servocontrol of position induces low-frequency resonant modes of the looped system that are excited as soon as the rotation speed corresponds to the frequency of modes subject to gyroscopic effect, referred to as the critical speed. On crossing a critical speed, the rotor has a larger or smaller orbit (precession orbit) and the servocontrol system tends to produce a higher and higher compensation force, and this can eventually lead to saturation of the power amplifiers. To minimize the power needed, it is therefore necessary to reduce the reaction force of the bearings, caused by the imbalance operating on the control function in the manner of a synchronous disturbance.

In its most direct application, the invention consists in minimizing the bearing control signal in non-stationary mode from a low speed up to the nominal speed, with no learning process, and crossing the bearing critical speeds, the effect of which is to eliminate the vibrations caused by the imbalance or to eliminate synchronous vibratory components of the control signal, which amounts to the same thing.

To this end, it is first necessary to define in the processing system a model of the disturbance caused by the imbalance, in order to be able to determine the form of compensation to be added into the loop to minimize the control signal in relation to the disturbance generated.

A first approach is to see the imbalance as a disturbing force, additive to the control force, and having an amplitude proportional to the mass of the rotor and to the square of the rotation speed and a phase at the origin that varies as a function of the rotation speed. The phase at the origin corresponds to an angle that evolves as a function of the rotation speed as the center S moves from O toward G. The drawback of this imbalance model is that knowing how the phase at the origin varies requires a comprehensive knowledge of the system, which is very difficult to obtain. It would in fact be necessary to know the location of the center of rotation S.

Figure 2:
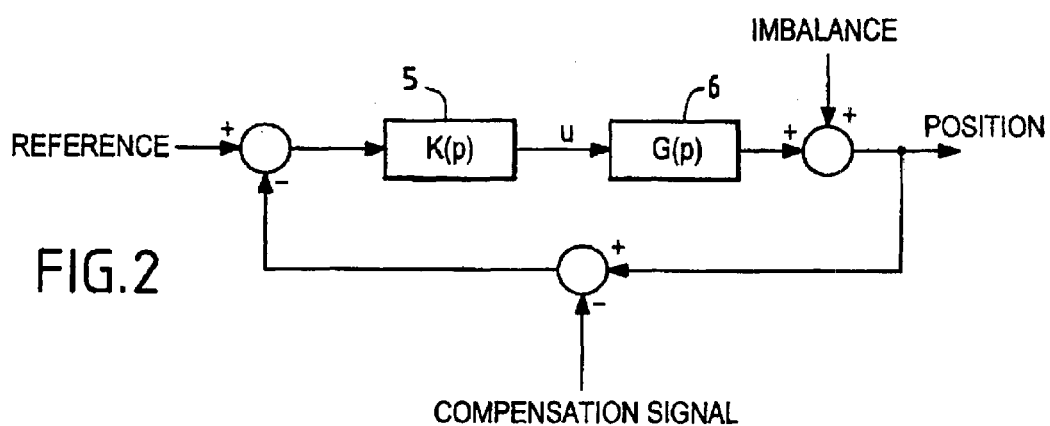
FIG. 2 is a simplified diagram of the FIG. 1 loop with an imbalance model added in accordance with the invention.

Modeling the imbalance as an additive position disturbance of constant amplitude and phase at the origin, as shown in FIG. 2, could also be envisaged. This reflects the fact that the imbalance is a constant geometrical offset between the centers O and G.

For simplicity, and because it is not known how the phase at the origin varies, it is the latter model that has been adopted, in which it is assumed that the imbalance is known perfectly, which is equivalent to generating a compensation signal corresponding to the imbalance considered and injecting it into the loop ahead of the corrector. This minimizes the variations of the control voltage u and therefore minimizes synchronous vibrations.

The model used here represents a particular view, simplified and for one channel. For this type of model, the imbalance can be considered as a synchronous output disturbance. The disturbance nevertheless varies slightly, since this is not a direct model of the imbalance. In the context of the present description, in order to simplify an understanding of the phenomena involved, it is simpler to refer to this signal as the imbalance, but strictly speaking it is merely an additive synchronous output signal.

Figure 3:
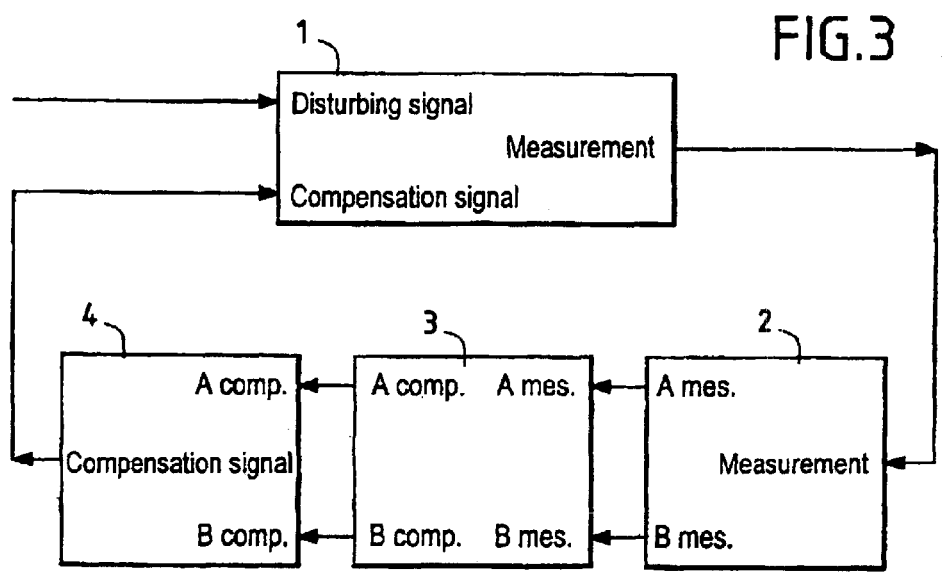
FIG. 3 is a block diagram depicting the compensation principle of the invention.

FIG. 3 is a functional block diagram that depicts the principle in accordance with the invention of compensating a harmonic disturbance in the rotor position regulation loop, as caused by imbalance, for example. The elements to be taken into account in the closed loop are the point or points at which the target disturbance, which may be variable, is injected, the measurement point or points, the point or points at which compensation signals are injected, and the transfer functions between the inputs and the outputs considered here for adapting the compensation signal to gain and phase variations during such transfer. In FIG. 3, the block 1 represents the system for processing the signal as depicted in FIG. 1, which receives at its input a disturbance signal and an associated compensation signal and delivers at its output a measured rotor position signal. There are three steps between measuring and re-injecting the signals, corresponding to the blocks 2, 3, and 4 in FIG. 3. In the block 2, a harmonic (respectively subharmonic or fundamental frequency) is separated by demodulation, a least squares method or Kalman filtering, and is used to construct a compensation signal representing it. The block 3 depicts a system for converting the compensation signal that is explained later. Finally, in the block 4, the converted compensation signal is modulated before re-injecting it into the processing system of the block 1.

The block 2 therefore restores a pertinent signal (the subharmonic, fundamental frequency or harmonic concerned) to a low frequency. If $\Omega$ denotes the rotation speed, consider the extraction of the harmonic (respectively subharmonic or fundamental frequency) $H_n$, i.e. the portion of the signal evolving at an angular frequency $n\Omega$ (where n=k or 1/k and k is a positive integer). The harmonic $H_n$ may be written:

$$H_n = A_{Hn} \cos(n\Omega t) + B_{Hn} \sin(n\Omega t)$$

The parameters $A_{Hn}$ and $H_n$ are referred to herein as the pertinent information of the harmonic signal $H_n$. The pertinent signal, which depends on the target harmonic, may be extracted by demodulation, a least squares method or Kalman filtering.

In a first embodiment, the block 3 includes a low-pass filter and a rotation matrix whose settings are explained hereinafter. The block 4 reconstitutes a compensation signal at the angular frequency concerned from the pertinent signal resulting from the calculations and transforms effected in the block 3. In other words, the block 4 has the converse function to the block 2.

Two embodiments that are mathematically equivalent to the first may be envisaged, depending on the functions to be included in the block 3. Thus in a second embodiment, the geometrical operation that consists in applying a rotation to the measured pertinent signal can be effected in the block 4, which then applies re-modulation using sine and cosine signals with a phase difference $\theta$ equal to the angle of rotation of the matrix of the block 3 of the first embodiment, which produces at the output of the block 4 a signal of the following form:

$$(A_{comp}, B_{comp}) \Rightarrow (A \cos(n\Omega t - \theta), B \sin(n\Omega t - \theta))$$

Alternatively, in a third embodiment, this geometrical operation can be effected in the block 2, which then applies demodulation using sine and cosine signals with a phase difference $\theta$ equal to the rotation angle of the matrix of the block 3 of the first embodiment, which produces at the output of the block 2 a vector of the following form:

$$(A_{mes}, B_{mes}) \Rightarrow (A_0 \cos(\theta) - B_0 \sin(\theta), A_0 \sin(\theta) + B_0 \cos(\theta))$$

where Measurement=$(A_0 \cos(n\Omega t) + B_0 \sin(n\Omega t))$.

The phase difference $\theta$ applied in the second and third embodiments can also be applied when demodulation is effected by a least squares method or Kalman filtering.

Figure 4:
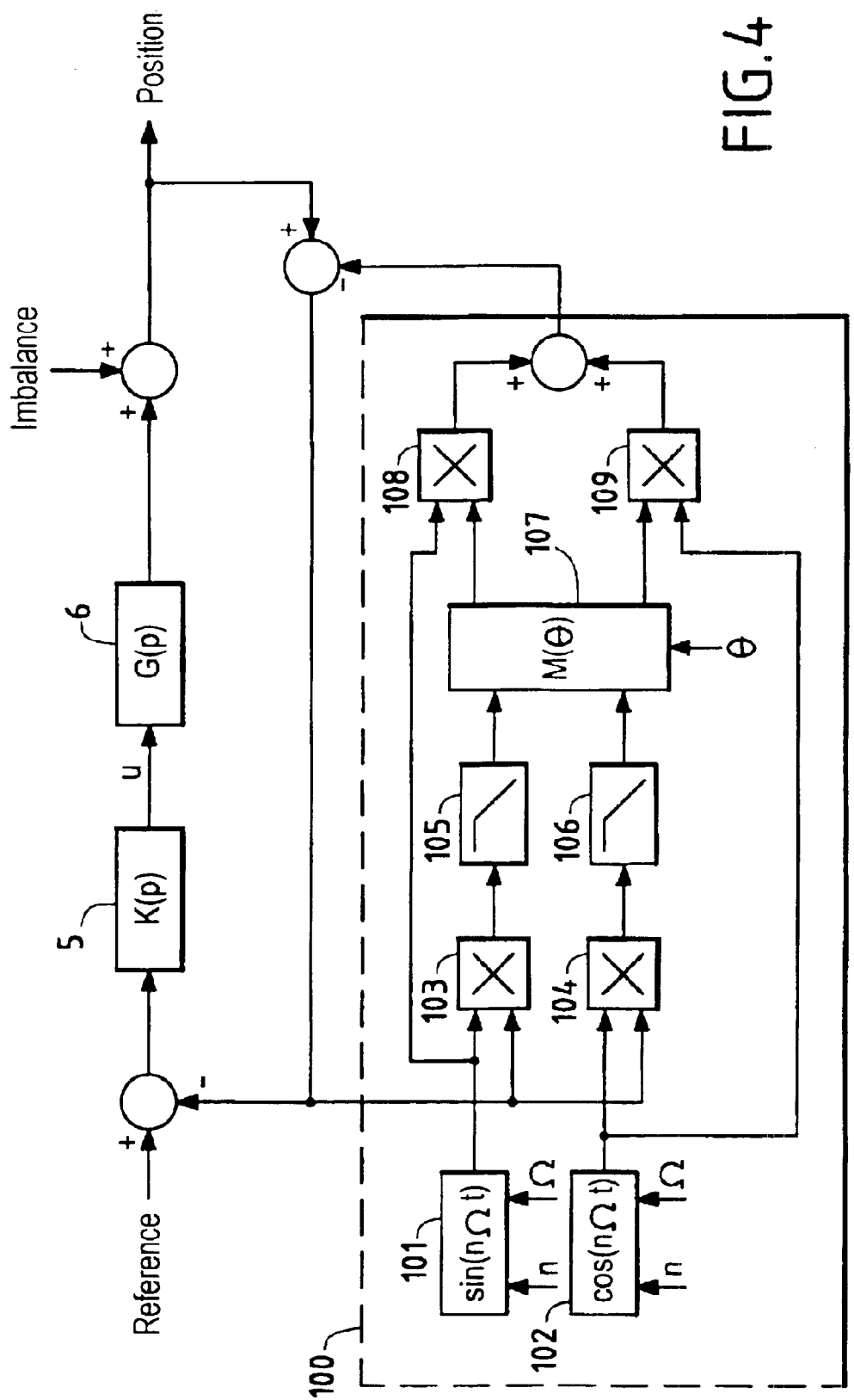
FIG. 4 is a simplified diagram of a first embodiment of an active compensation device conforming to the invention.
Figure 5:
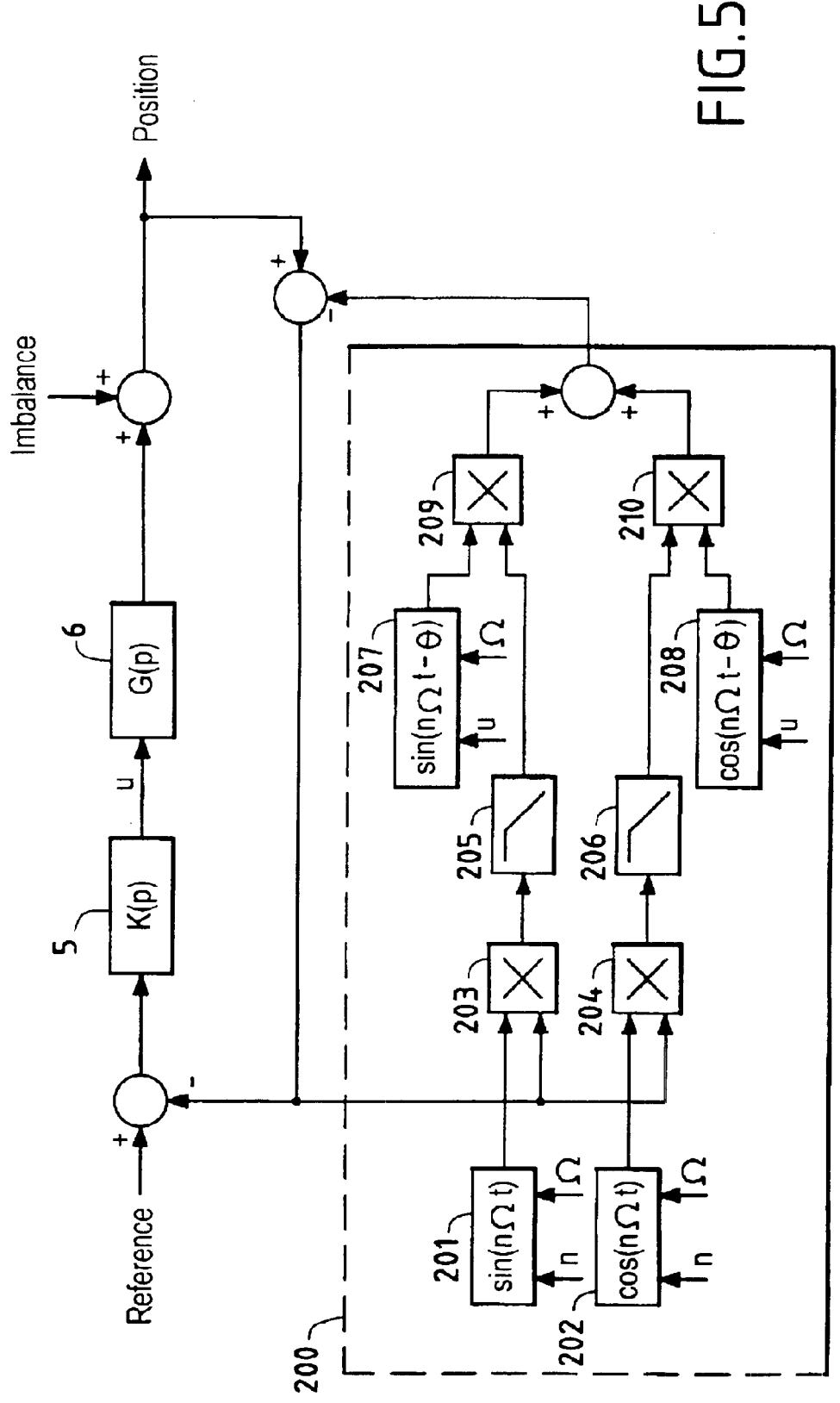
FIG. 5 is a simplified diagram of a second embodiment of an active compensation device conforming to the invention.
Figure 6:
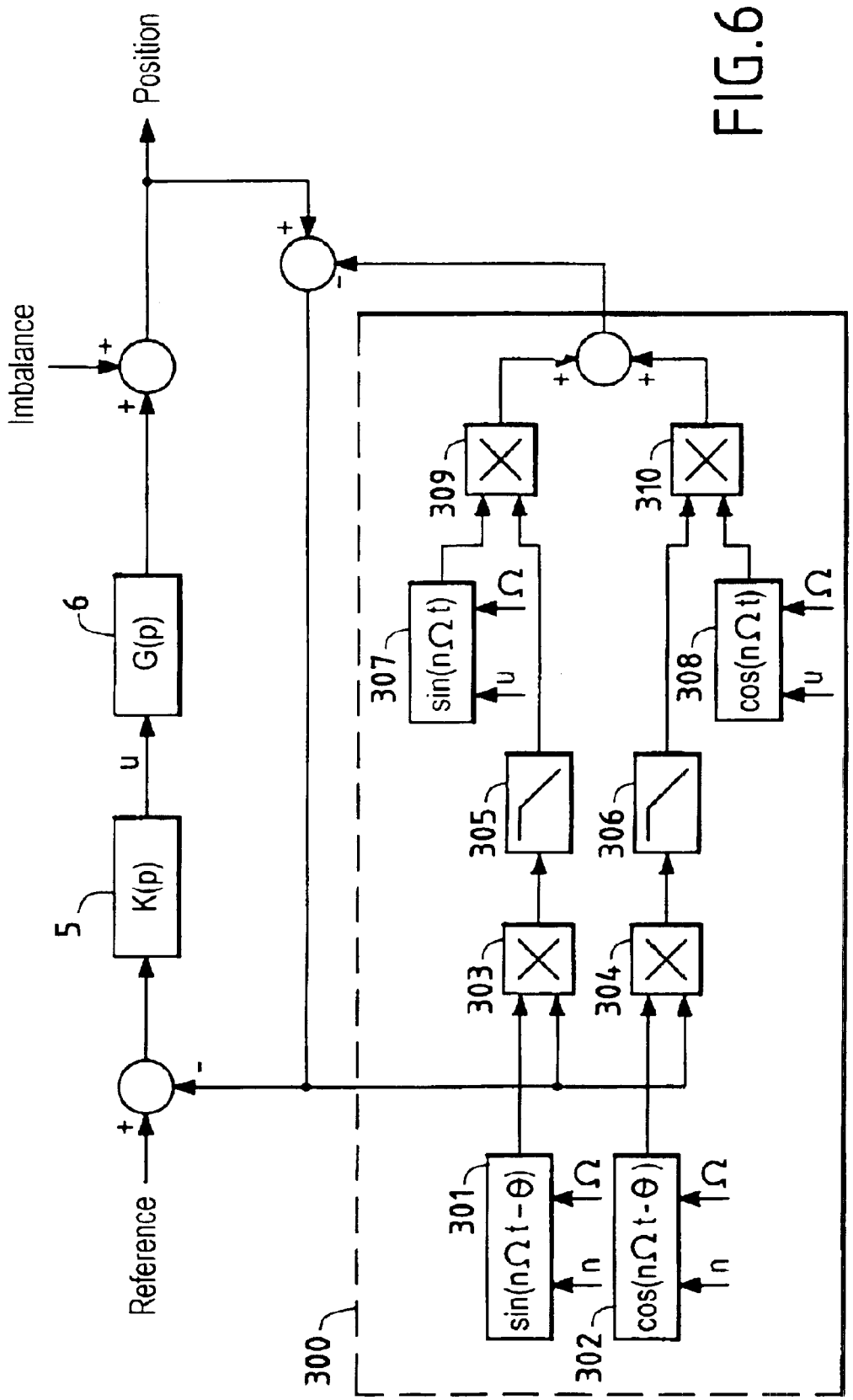
FIG. 6 is a simplified diagram of a third embodiment of an active compensation device conforming to the invention.

FIGS. 4, 5 and 6 depict examples of compensation circuits conforming to the first, second and third embodiments of the invention, respectively, for generating a compensation signal in the position servocontrol loop.

In FIG. 4, the measured position signal is multiplied in a circuit 100 by a sine component and a cosine component, both components evolving at an angular frequency $n\Omega$ (where $\Omega$ is the rotation speed), coming from a sine signal generator 101 and a cosine signal generator 102, respectively, and fed to the input of first and second multiplier units 103 and 104. The two signal generators 101 and 102, together with the associated multiplier unit, form the circuit for extracting the pertinent signal, and each includes rotation frequency $\Omega$ and factor n reference means; as already stated, the value of n determines the subharmonic (n=1/k, where k is a positive integer), the harmonic (n=k), or the fundamental frequency (n=1), to be extracted from the position signal in the loop.

The sine component at the output of the multiplier unit 103 obtained in this way is then filtered in a low-pass filter 105 and the cosine component at the output of the multiplier unit 104 obtained in this way is filtered in a low-pass filter 106. The filters 105 and 106 each filter a substantially continuous component which, as explained above, correspond to the parameters $A_{Hn}$ and $B_{Hn}$, respectively, constituting the pertinent information of the extracted harmonic signal $H_n$. A rotation matrix 107 than applies a rotation $\theta$ to the two components obtained by filtering. The rotation applied may be represented in the form of the following matrix product:

$$\begin{pmatrix} A_{comp} \\ B_{comp} \end{pmatrix} = \begin{pmatrix} \cos\theta & -\sin\theta \\ \sin\theta & \cos\theta \end{pmatrix} \times \begin{pmatrix} A_{Hn} \\ B_{Hn} \end{pmatrix}$$

The two components resulting from the transforms effected in the rotation matrix are then transmitted to third and fourth multiplier units 108 and 109, respectively, which each multiply the component resulting from the transforms by the signal generated by the sine signal generator 101 and the cosine signal generator 102. This latter operation modulates each of the two components of the transformed compensation signal at the angular frequency nΩ concerned, before adding them to produce a common signal that is injected into the servocontrol loop.

The circuit 100 therefore extracts a harmonic (respectively subharmonic or fundamental frequency) signal from a synchronous disturbance and applies the necessary transforms to it before re-injecting it into the loop as a disturbance compensation signal. Because the circuit 100 in the loop is between the position measurement function and the corrector 5, it is possible to extract the pertinent components of the synchronous disturbance concerned from the measurement data and to re-inject an approximate compensation signal into the loop ahead of the corrector, so that the latter ignores the target disturbance, thereby minimizing the control signal applied to the bearings in relation to this disturbance.

FIG. 5 depicts one example of a circuit conforming to the second embodiment of the invention. The circuit 200 depicted in FIG. 5 differs from the FIG. 4 circuit 100 primarily in that it no longer comprises any rotation matrix, the rotation angle θ here being applied in the form of an equivalent phase shift when re-modulating components of the compensation signal in multiplier units 209 and 210. The pertinent components of the harmonic concerned are extracted and filtered in the same way as in the embodiment described with reference to FIG. 4. To this end, as in FIG. 4, the circuit 200 includes a sine signal generator 201 and a cosine signal generator 202, both of angular frequency nΩ. Each is connected to a multiplier unit 203 or 204 to extract the sine and cosine components of the target harmonic from the measurement signal, which is also fed to the input of the multiplier units 203 and 204. Two low-pass filters 205 and 206 respectively filter the parameters $A_{Hn}$ and $B_{Hn}$ constituting the pertinent information of the extracted harmonic signal $H_n$. Thus in this embodiment the angle θ takes the form of a phase shift equivalent to a rotation angle θ applied by means of signal generators 207 and 208, which respectively generate a sine signal and a cosine signal, both at an angular frequency nΩ, like the generators 201 and 202, but with a phase difference of θ. The compensation signal resulting from summing the converted and remodulated components re-injected into the loop is mathematically equivalent to that generated by the FIG. 5 circuit 100.

The FIG. 6 circuit 300 is substantially the same as the FIG. 5 circuit 300 and all components identical to those in FIG. 5 have the same function as described above. The only difference is that the phase difference angle θ is now applied when the target harmonic is demodulated by the signal generators 301 and 302, which respectively deliver sine and cosine signals at the angular frequency nΩ with a phase difference θ. The other components of the circuit 300 common to FIG. 4 operate in the same way as in the circuit 200 and the compensation signal delivered by the circuit 300 is mathematically equivalent to that generated by the circuit 100 or 200.

The three embodiments of the circuit for generating a compensation signal described above apply a correction angle θ to the compensation signal in the form of a rotation or a phase difference. This correction reflects the fact that the phase of the disturbance caused by the imbalance varies on crossing the bearing modes. Thanks to the a priori modeling defined above and based on the behavior of the rotor caused by an imbalance force, it is possible to determine a correction angle that causes the looped system to converge. This ensures stability (convergence) of the closed loop and consequently applies the compensation over the whole of the rotor speed range, in particular on crossing the critical speeds (bearing modes).

The imbalance as defined in the model employed by the present invention may be observed through what is referred to herein as a "sensitivity" or "error" function of the system.

The sensitivity function of a servocontrol system is the transfer function:

$$S(j\omega) = \frac{1}{1 + G(j\omega)K(j\omega)}$$

where G and K respectively represent the transfer functions of the control system of the bearings 6 and the corrector 5 in the FIG. 1 block diagram.

Consider the FIG. 2 imbalance model without the compensation signal in the loop: measuring the position signal, or the error signal in the absence of the reference signal, measures a response of the looped system to the imbalance. The sensitivity function, with its gain and phase transforms, acts like a filter through which the imbalance is observed. It is the modification of the phase of the imbalance signal as observed through the sensitivity function that has to be corrected.

Thus determining the value of the correction angle θ to be applied to the compensation signal necessitates measuring the sensitivity function of the system, where necessary for each bearing, in order to be able to restore the real imbalance signal. For example, the closed loop method of compensating synchronous disturbances described in French Patent FR 2 336 602 does not take account of the evolution of the phase of the sensitivity function, and for good reason: after crossing the bearing modes, i.e. at a speed at least 20% greater than the critical speed, and thus when the method can be used with no risk of destabilizing the system, the phase of the sensitivity function is zero. Also, the position signal that is observed by way of response is in phase with the imbalance signal.

To measure the sensitivity function of the system, it is necessary to select an excitation signal ξ and then to measure a response signal α. It is then sufficient to establish the ratio:

$$S(j\omega) = \frac{\alpha}{\xi}$$

Figure 7:
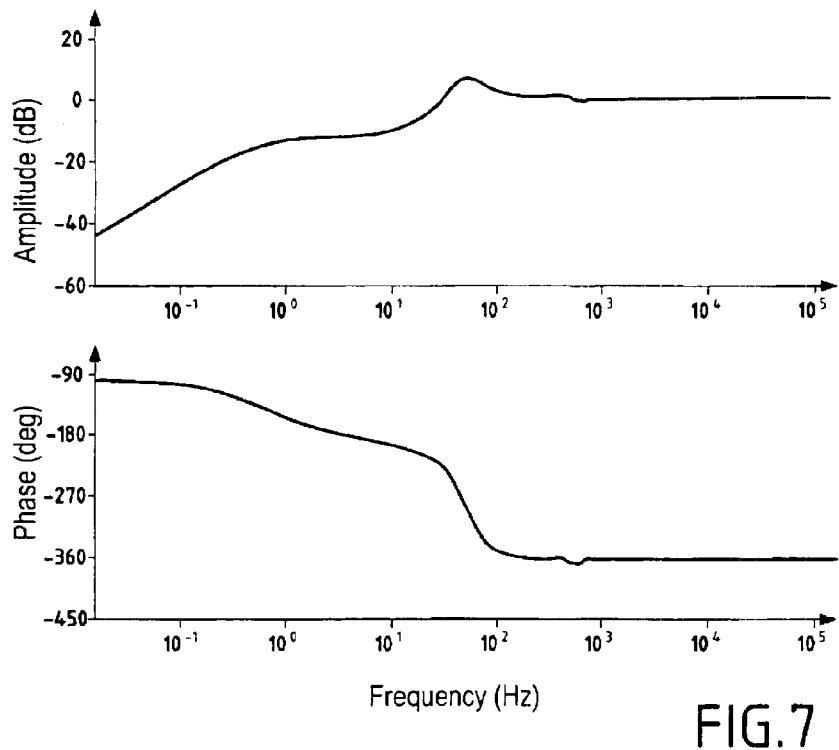
FIG. 7 depicts one example of an amplitude and phase curve of a Bode diagram of a sensitivity function as measured on a rotating machine with active magnetic bearings.

Nevertheless, if the system is looped with a "+" sign and the corrector consequently has a negative overall gain, then it is −S(jω) that is measured, i.e. the function equal to and opposite the sensitivity function, with a phase difference π relative to S(jω). For example, FIG. 7 depicts the trend of the Bode diagram of a sensitivity function measured on a rotating machine equipped with active magnetic bearings when stopped. If the sensitivity function, here representing the imbalance observed when stationary or at a given speed, indicates a gain variation, this must also be compensated in order to apply accurately a converse transform, which can be regarded as a relation of geometrical similarity, of angle θ and amplification factor g, to the image of the imbalance that is observed in order to determine the imbalance. The gain of the filters can be adjusted to correspond to the amplification factor of the relationship of geometrical similarity that is to be applied.

One example of determining a correction angle θ is described next with reference to FIG. 8, which depicts the evolution of the phase of a translation sensitivity function of a rotating machine equipped with active magnetic bearings measured when stopped.

Figure 8:
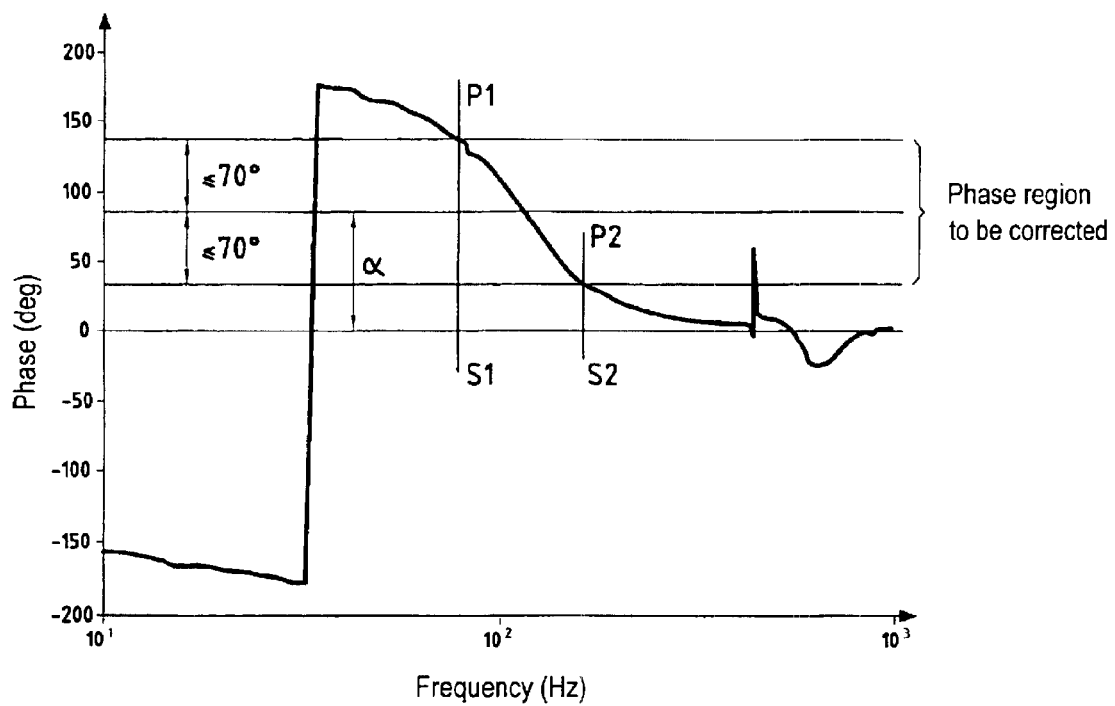
FIG. 8 shows one example of a phase curve of a Bode diagram of a sensitivity function.

On the FIG. 8 phase curve, a tripping threshold $S_1=80$ Hz is selected for the compensation device of the invention. This value ensures that only one correction rotation angle is needed a posteriori. The stopping threshold $S_2$ selected for the compensation device is $S_2=170$ Hz for a maximum speed $\Omega$ of 230 Hz. FIG. 8 depicts the phase curve of the translation sensitivity function. $P_1$ and $P_2$ are respectively the points on the phase curve situated at the frequencies $S_1$ and $S_2$.

The coordinates of these points are written as follows:

$$P_1(S_1=80 \text{ Hz}, \phi_1=137°)$$

$$P_2(S_2=170 \text{ Hz}, \phi_2=33°)$$

It is therefore a matter of rectifying the phase of the sensitivity function between these two points using a single correction rotation angle. The following interpretation may be given to the above points: on rotation at 80 Hz (respectively 170 Hz), the ideal compensation angle is 137° (respectively 33°). It has been shown that the closed loop compensation system of the invention remains convergent and attractive toward a point of stability with a single compensation angle, which is defined as follows (see the graphical interpretation in FIG. 8):

$$\alpha = \varphi_2 + \left(\frac{\varphi_1 - \varphi_2}{2}\right)$$

$$\alpha = \frac{\varphi_1 + \varphi_2}{2}$$

$$\alpha = 85°$$

The object is to distribute the compensation optimally for the two ends of the phase region in which it is required to implement the invention. Thus, although it does not correspond to the phase of the mid-point $P_m$ in FIG. 8, i.e. the compensation is not ideal for that point, a rotation angle $\alpha=85°$ minimizes the control signal when compensating the imbalance between $S_1$ and $S_2$. This highlights the attractivity of the convergence point.

However, the convergence has limits. Consider the phase of the compensated system $|\phi-\alpha|=\phi_c$: the theoretical limit of instability is such that $\phi_c=90°$. The nearer that point, the greater the risk of destabilization of the system. A compensated phase $\phi_c \leq 70°$ therefore constitutes a good compromise, and the following condition is therefore applied:

$$|\phi_1-\alpha| \leq \phi_{lim}=70°$$

$$|\phi_2-\alpha| \leq \phi_{lim}=70°$$

In the present example, it is found that the correction rotation angle value adopted does satisfy the stability criteria referred to.

Consequently, the invention is designed to tolerate disturbance signal variations and a measurement that is distorted by its propagation through the transfer functions of the regulation loops. In the case of processing the imbalance, a partial knowledge of the transfer functions of the regulation loops is sufficient for adjusting the parameters of the invention and predetermining the stability of the system. Thus it is sufficient to know one point on the phase curve of the Bode diagram of the transfer functions that correspond to the sensitivity function described above in the case of an imbalance. As demonstrated in the above example, if this point is judiciously selected after a robustness study, the stability of the system is guaranteed over the whole of the range of operation previously selected.

Determining the gain and the cut-off frequency of the low-pass filters used in the system of the invention amounts to finding a compromise. The first thing to be taken into account is the filter used to filter the harmonics after demodulation. The classic compromise linking robustness and performance applies here: the higher the cut-off frequency of the filter, the faster convergence is obtained, but this entails the risk of passing demodulation harmonics. Moreover, a high gain leads to a high convergence quality, but it is nevertheless necessary to avoid the phenomena of digital overflow. For example, a gain of 50 and a cut-off frequency of 10 Hz may be selected for a low-acceleration machine, such as a turbomolecular pump. For a high-acceleration machine, such as a machining spindle, a high gain of 50 may also be used, but a cut-off frequency of only 0.1 Hz.

It has been shown that measurements when stopped are sufficient for a system with little gyroscopic effect. The situation of a system with more gyroscopic effect is a little more complex to deal with, as it is no longer a question of measuring sensitivity functions when stopped, but rather of measuring the actual transfer function through which the imbalance is observed at any given time. To this end, it is necessary to measure the sensitivity function for different rotation speeds and then, for each of those speeds, to measure the frequency point on the curve corresponding to the rotation speed.

This can be summarized as follows: the above kind of transfer function depends on the frequency $\omega$ and on the rotation speed $\Omega$ and can be written $S(\omega, \Omega)$. The transfer function that is necessary consists of a set of points $S(\omega_i, \Omega_i)$ for different speeds $\Omega_i$. This is a fictional transfer (in the sense that it is a point by point construction), but it is nevertheless the exact form of synchronous frequency filtering through which the imbalance is observed.

The compensation device of the invention just described can be implemented in the form of an electronic circuit. The functions of the compensation device of the invention can also be implemented by code programmed and stored in a programmable microprocessor of the digital signal processor (DSP) type. However, the use of a programmable microprocessor is not imperative. An application specific integrated circuit (ASIC) is equally suitable. In this case, all the processing functions useful to the invention that are programmed and stored in the microprocessor are implemented in an integrated circuit specifically wired to implement those functions.

Figure 9A:
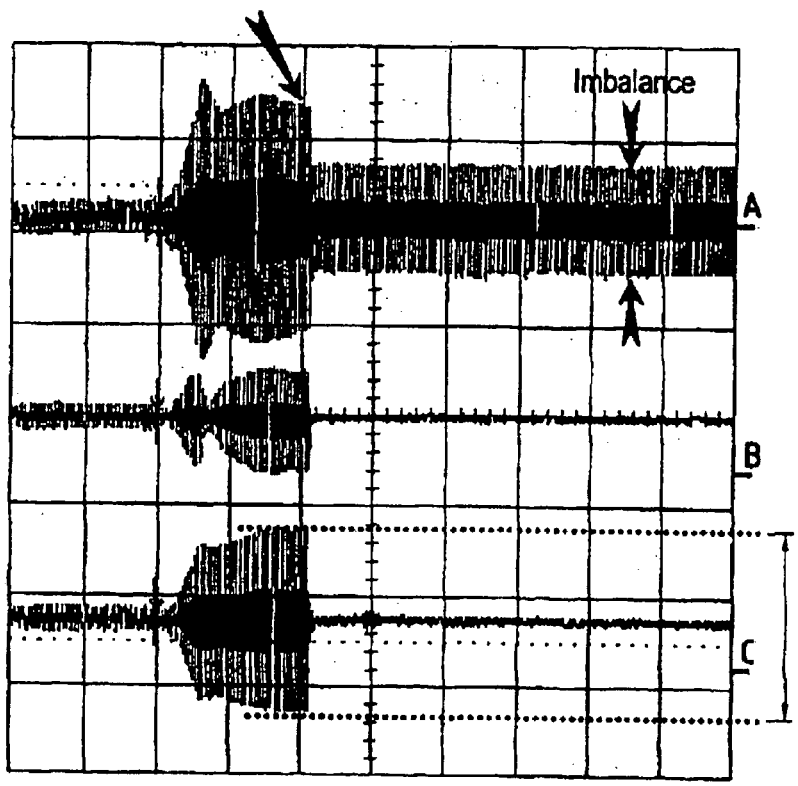
FIGS. 9A and 9B are diagrams depicting control variations in an air compressor with active magnetic bearings, respectively without and with the device of the invention.
Figure 9B:
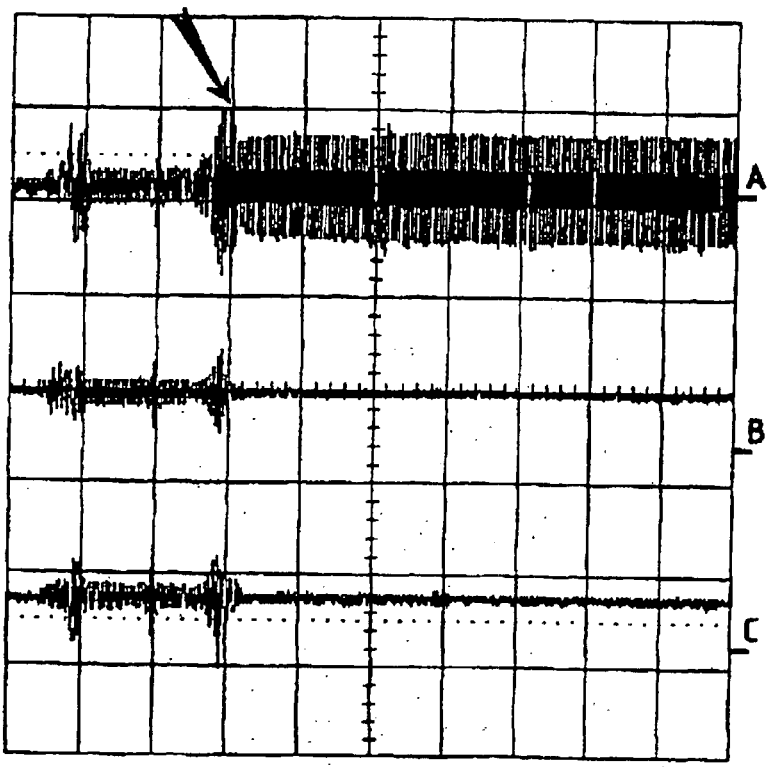

FIGS. 9A and 9B depict the results of tests carried out on an air compressor (rotor), where the present invention was used to eliminate vibrations due to imbalance. In each of FIGS. 9A and 9B, the signals A, B and C respectively represent the position, the control signal on a second translation axis, and the control signal on the translation axis concerned, to which a high imbalance has been added. FIG. 9A shows a rise in speed (corresponding to the extra voltage visible on the signals) on application of the closed loop device for compensating synchronous disturbances described in French Patent FR 2 336 602. This figure shows very clearly the extra voltage on the control signals (i.e. the signals B and C) on crossing the resonant mode. Beyond the resonant mode, after the compensation device is started up, the measured position corresponds to the distance between the inertia axis and the geometrical axis of the rotor. This minimizes the control signal for the bearings. In this example, the object of the invention is to be able to obtain the same operating characteristics without waiting to cross the resonant mode, and thus the extra voltage associated with the critical speed. This is depicted in FIG. 9B, which shows a rise in speed under the same conditions as for the example shown in FIG. 9A, but with application of the active compensation device of the invention. The control signal applied (i.e. the signals B and C) is at a minimum throughout the rise in speed after the device of the invention is started up. The air compressor rotates about its axis of inertia from a rotation speed of 60 Hz, which is much lower than its rigid mode critical speed, which can no longer be discerned.

The compensation device may be used as soon as stable speed information appears. In practice, the application speed is set at around 50% to 70% of the critical speed, depending on the application. For a turbomolecular pump, for example, the device is started from 30 Hz with a bearing mode at 55 Hz, whereas for an air compressor it is started from 100 Hz with a bearing mode at 130 Hz.

More generally, the invention eliminates any additive harmonic disturbance either of the response or of the control signal as soon as its frequency is known. Even if the primary application relates to the elimination of vibrations caused by imbalance, it is possible to take account of one or more harmonics or subharmonics of the rotation frequencies seen as signals injected into each regulation loop. It is therefore possible to reject fundamental frequency, harmonic or subharmonic signals even if their characteristics (amplitude, phase) change with time. The invention allows continuous determination of the characteristics of synchronous disturbances to be circumvented, even in the presence of variations therein and uncertainties and variations of the measuring system that depend primarily on the rotation speed. The robustness of the method and the device of the invention allow accurate cancellation without having an explicit complex model in the system, which allows an implementation that is particularly economic in terms of calculation time.

What is claimed is:

1. A compensation device for closed loop compensation of a synchronous disturbance in a rotating machine comprising a rotor magnetically suspended by at least one radial magnetic bearing comprising electromagnets driven by amplifiers, a radial detector device for sensing the axial position of the rotor, and a closed loop servocontrol circuit connected to said detector device and to said electromagnets and comprising a control circuit for controlling the energization of the electromagnets that supplies a control signal (u) to said amplifiers in response to signals supplied by the detector device to maintain the rotor in a predetermined axial position, which compensation device is characterized in that it comprises means for generating a signal for compensating the synchronous disturbance, said means being inserted into the servocontrol circuit ahead of the energization control circuit to minimize variation of the control signal in relation to the disturbance, and in that said compensation signal generator means comprise application means for applying at least one correction angle ($\theta$) to ensure the stability of the closed loop, said at least one correction angle being determined as a function of the phase variation of the disturbance observed over a particular range of rotation speeds.

2. A compensation device according to claim 1, characterized in that the compensation signal generator means comprise extractor means for extracting at least one frequency component of the disturbance signal in the servocontrol circuit, low-frequency filter means for filtering and transforming said extracted component, and modulator means for modulating the transformed component.

3. A compensation device according to claim 2, characterized in that said extractor means comprise a circuit for separating at least one subharmonic, fundamental frequency or harmonic component of the rotation speed of the machine by demodulation, a least squares method or Kalman filtering.

4. A compensation device according to claim 2, characterized in that said means for transforming the extracted component comprise a rotation matrix for applying the correction angle ($\theta$) to the compensation signal.

5. A compensation device according to claim 2, characterized in that said means for transforming the extracted component comprise means for applying a corresponding phase shift to the correction angle ($\theta$).

6. A compensation device according to claim 5, characterized in that said means for applying a phase shift are included in the extractor means.

7. A compensation device according to claim 5, characterized in that said means for applying a phase shift are included in the means for modulating the converted signal.

8. A compensation device according to claim 1, characterized in that the synchronous disturbance is a disturbance caused by an imbalance in the rotor.

9. A compensation device according to claim 1, characterized in that it is activated from a rotating machine rotation frequency of 30 Hz in the case of a turbomolecular pump or 100 Hz in the case of an air compressor.

10. A method of closed loop compensation of a synchronous disturbance in a rotating machine comprising a rotor magnetically suspended by at least one radial magnetic bearing comprising electromagnets driven by amplifiers, a radial detector device for sensing the axial position of the rotor, and a closed loop servocontrol circuit connected to said detector device and to said electromagnets and comprising a control circuit for controlling the energization of the electromagnets that supplies a control signal (u) to said amplifiers in response to signals supplied by the detector device to maintain the rotor in a predetermined axial position, which method is characterized in that it comprises a step of generating a compensation signal for compensating the synchronous disturbance comprising the application of at least one correction angle ($\theta$) to ensure the stability of the closed loop, said at least one correction angle being determined as a function of the phase variation of the disturbance observed over a particular range of rotation speeds, and a step of injecting said compensation signal into the servocontrol circuit ahead of the energization control circuit to minimize the variation of the control signal in relation to the disturbance.

11. A method according to claim 10, characterized in that the step of generating the compensation signal includes a step of extracting at least one frequency component from the disturbing signal in the servocontrol circuit, a step of low-frequency filtering of the extracted component, a step of transforming said extracted component, and a step of modulating the transformed component.

12. A method according to claim 11, characterized in that the extraction step comprises the separation of at least one subharmonic, fundamental frequency or harmonic component of the rotation speed of the machine by demodulation, a least squares method or Kalman filtering.

13. A method according to claim 11, characterized in that the step of transforming the extracted component includes applying a rotation to said component to apply the correction angle ($\theta$) to the compensation signal.

14. A method according to claim 11, characterized in that the step of transforming the extracted component includes applying an angular phase shift corresponding to the correction angle (θ).

15. A method according to claim 14, characterized in that the angular phase shift is applied during the extraction step.

16. A method according to claim 14, characterized in that the angular phase shift is applied during the step of modulating the converted signal.

17. A method according to claim 11, characterized in that the synchronous disturbance is caused by an imbalance in the rotor.

18. A method according to claims 11, characterized in that it is activated from a rotating machine rotation frequency of 30 Hz in the case of a turbomolecular pump or 100 Hz in the case of an air compressor.

19. A compensation device according to claim 3, characterized in that said means for transforming the extracted component comprise a rotation matrix for applying the correction angle (θ) to the compensation signal.

20. A compensation device according to claim 3, characterized in that said means for transforming the extracted component comprise means for applying a corresponding phase shift to the correction angle (θ).

21. A compensation device according to claim 20, characterized in that said means for applying a phase shift are included in the extractor means.

22. A compensation device according to claim 20, characterized in that said means for applying a phase shift are included in the means for modulating the converted signal.

23. A compensation device according to claim 21, characterized in that:
the synchronous disturbance is a disturbance caused by an imbalance in the rotor;
it is activated from a rotating machine rotation frequency of 30 Hz in the case of a turbomolecular pump or 100 Hz in the case of an air compressor.

24. A compensation device according to claim 22, characterized in that:
the synchronous disturbance is a disturbance caused by an imbalance in the rotor;
it is activated from a rotating machine rotation frequency of 30 Hz in the case of a turbomolecular pump or 100 Hz in the case of an air compressor.

25. A method according to claim 12, characterized in that the step of transforming the extracted component includes applying a rotation to said component to apply the correction angle (θ) to the compensation signal.

26. A method according to claim 12, characterized in that:
the step of transforming the extracted component includes applying an angular phase shift corresponding to the correction angle (θ);
the angular phase shift is applied during the extraction step;
the angular phase shift is applied during the step of modulating the converted signal;
the synchronous disturbance is caused by an imbalance in the rotor;
it is activated from a rotating machine rotation frequency of 30 Hz in the case of a turbomolecular pump or 100 Hz in the case of an air compressor.

27. A method according to claim 25, characterized in that:
the synchronous disturbance is caused by an imbalance in the rotor;
it is activated from a rotating machine rotation frequency of 30 Hz in the case of a turbomolecular pump or 100 Hz in the case of an air compressor.

* * * * *

UNITED STATES PATENT AND TRADEMARK OFFICE
CERTIFICATE OF CORRECTION

PATENT NO. : 6,927,550 B2  
APPLICATION NO. : 10/488847  
DATED : August 9, 2005  
INVENTOR(S) : Vincent Tamisier et al.

It is certified that error appears in the above-identified patent and that said Letters Patent is hereby corrected as shown below:

Front page, (54), line 3, "DISTURBANCE" should read --DISTURBANCES--;

Column 1, line 36, "k" should read --$\underline{k}$--;

Column 5, line 65, "frequency of" should read --frequency $f_0$ of--;

Column 6, line 5, "k" should read --$\underline{k}$--;

Column 6, line 12, "u" should read --$\underline{u}$--;

Column 6, line 13, "u" should read --$\underline{u}$--;

Column 6, line 14, "u" should read --$\underline{u}$--;

Column 7, line 17, "u" should read --$\underline{u}$--;

Column 7, line 59, "k" should read --$\underline{k}$--;

Column 8, line 44, "n" should read --$\underline{n}$--;

Column 8, line 45, "n" should read --$\underline{n}$--;

Column 8, line 46, "k" should read --$\underline{k}$--;

Column 10, line 61, "g" should read --$\underline{g}$--;

Column 11, line 15 "$P_1(S_1=80\ Hz, \phi_1=137°)$" should read --$P_1(S_1 = 80\ Hz, \varphi_1 = 137°)$ --;

Column 11, line 16 "$P_2(S_2=170\ Hz, \phi_2=33°)$" should read --$P_2(S_2 = 170\ Hz, \varphi_2 = 33°)$ --;

Column 11, line 45, "$|\phi-\alpha|=\phi_c$:" should read -- $|\varphi - \alpha| = \varphi_c$: --;

Column 11, line 46, "$\phi_c=90°$." should read --"$\varphi_c = 90°$.--;

Column 11, line 48, "$\phi_c \leq 70°$" should read --$\varphi_c \leq 70°$--

UNITED STATES PATENT AND TRADEMARK OFFICE
CERTIFICATE OF CORRECTION

PATENT NO. : 6,927,550 B2
APPLICATION NO. : 10/488847
DATED : August 9, 2005
INVENTOR(S) : Vincent Tamisier et al.

It is certified that error appears in the above-identified patent and that said Letters Patent is hereby corrected as shown below:

Column 11, line 52, "$|\phi_1 - \alpha| \leq \phi_{lim} = 70°$" should read --$|\varphi_1 - \alpha| \leq \varphi_{lim} = 70°$--;

Column 11, line 53, "$|\phi_2 - \alpha| \leq \phi_{lim} = 70°$" should read --$|\varphi_2 - \alpha| \leq \varphi_{lim} = 70°$--; and Column 15, line 13, "claims" should read --claim--.

Signed and Sealed this

Twenty-fourth Day of October, 2006

JON W. DUDAS
*Director of the United States Patent and Trademark Office*